Figure 1:
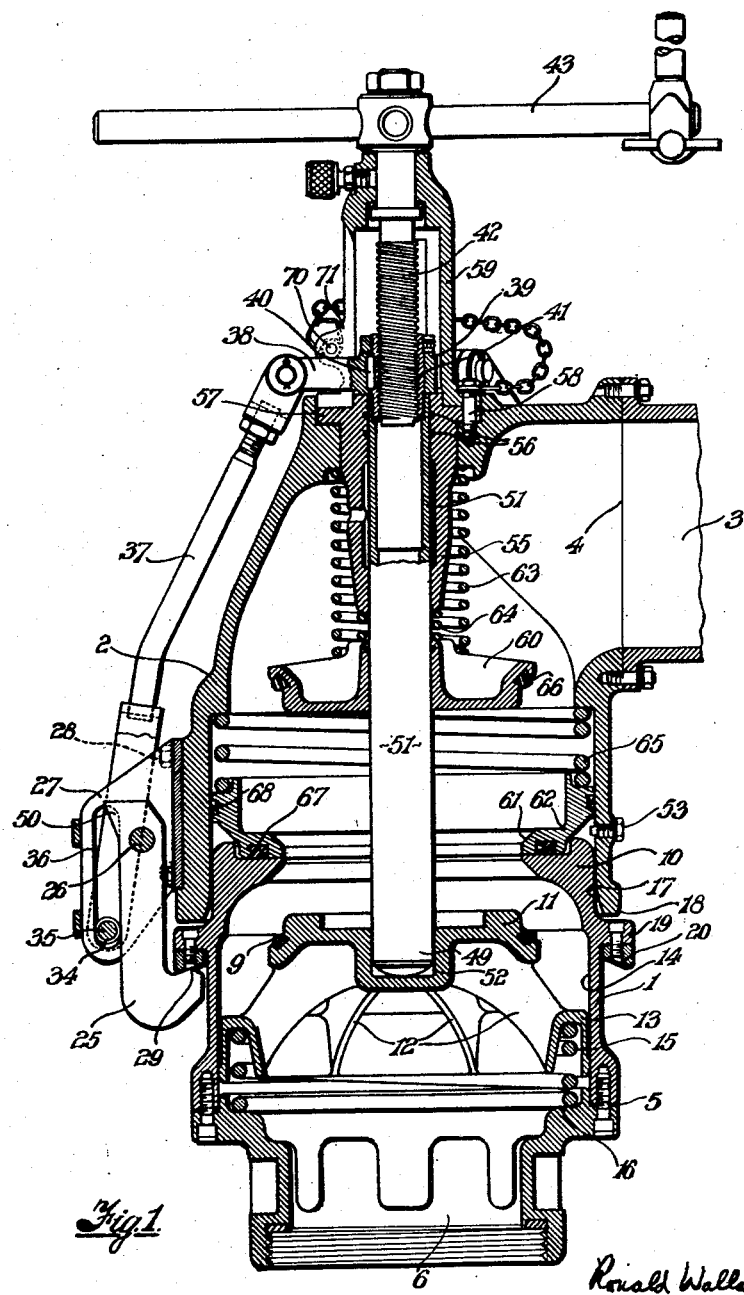

Dec. 14, 1954  R. W. BUCKLER  2,696,993
VALVED PIPE COUPLING

Filed June 6, 1949 2 Sheets-Sheet 1

Inventor
Ronald Wallace Buckler
By Stevens, Davis, Miller & Mosher
his Attorneys Dec. 14, 1954 R. W. BUCKLER 2,696,993
VALVED PIPE COUPLING Filed June 6, 1949 2 Sheets-Sheet 2

Inventor
Ronald W. Buckler
By
Stevens Davis Miller & Mosher
his Attorneys

United States Patent Office 2,696,993
Patented Dec. 14, 1954

2,696,993

VALVED PIPE COUPLING

Ronald W. Buckler, Mayfair, London, England, assignor to Sterling Industries Limited, Mayfair, London, England, a British company Application June 6, 1949, Serial No. 97,361

Claims priority, application Great Britain March 14, 1949

2 Claims. (Cl. 284—17)

This invention relates to self-sealing coupling valves and has particular reference to such as are required in oil pipe lines and like conduits wherein each coupling part constitutes the terminal portion of a pipe and wherein the sealing-off of each pipe line portion is ensured when the said coupling parts are in their uncoupled state.

Without limitation the invention finds useful application in oil pipe lines employed for fuel oil bunkering, and at ports for the shipment or unloading of cargoes of oil, spirit, molasses and like fluids. Equally they can be used for fluids, such as water, gas or steam.

It is the general object of the invention to provide a valved coupling of the kind referred to above which is particularly suitable for use with pipe lines of large diameter, and wherein a positive external locking means operates to maintain the valved pipe terminals in their intercoupled condition to permit the passage of fluid therethrough.

Another object of the invention is the provision of a valve coupling wherein the sealing-off of each pipe line portion is ensured during the act of coupling or uncoupling these parts so as to prevent leakage of the fluid contents whilst uncoupling and the trapping of air within the pipe line whilst coupling.

A further object of the invention is the provision of a manually operable means for actuating the said positive external locking means and controlling the operation of a stop-valve, which valve effects sealing-off of its pipe terminal portion under spring pressure when the latter is in an uncoupled state.

A still further object of the invention is the provision of an automatic check-valve for sealing-off the other pipe terminal part in its uncoupled state, this valve being adapted to open only under fluid pressure resulting from the passage of fluid into its pipe terminal part through said coupling.

According to the invention the self-sealing coupling comprises two pipe terminal parts, each terminal part having an axially mobile valve closure member disposed co-axially therewithin, a manually operable means being provided for controlling the opening of one said valve member after having interlocked said pipe terminal parts in their coupled condition, the other of said valve closure members being automatic in operation and adapted to open under fluid pressure resulting from the passage of fluid into its pipe terminal part through said coupling.

Figure 2:
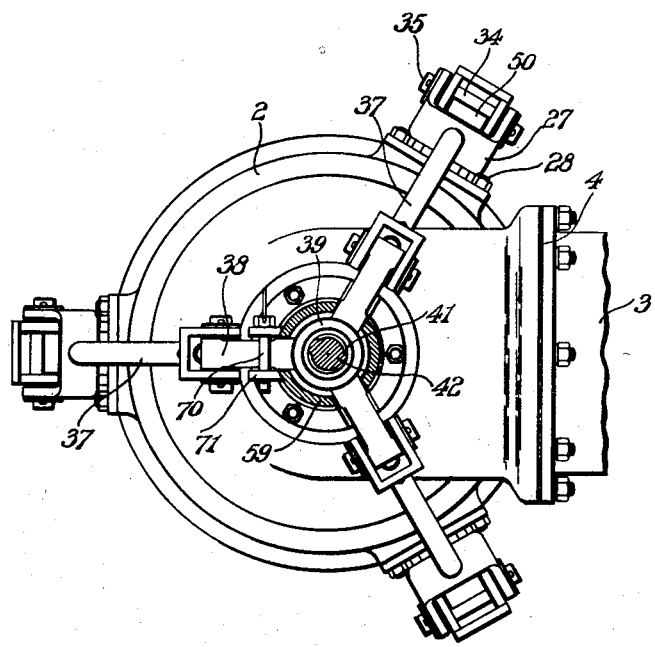

In order that the present invention will be more fully understood a preferred embodiment thereof will now be described by way of example, with reference to the accompanying drawings, wherein, Figure 1 is a side part-sectional elevation of the valved pipe coupling in its coupled state, and, Figure 2 is a plan view of the pipe coupling.

As shown in the accompanying drawings the coupling comprises a spigot part 1 and a socket part 2, the socket part forming the terminal portion of a pipe 3 to which it is attached as at 4 and the spigot part having connected therewith as at 5 an internally threaded pipe connection member 6.

The spigot part 1 is formed with an internally extending flange 10 the underside of which constitutes a valve seating adapted to receive an axially mobile stop-valve member 11 for closure of the spigot pipe terminal part. The stop-valve member 11 is supported for axial movement within the spigot housing by a series of radial spider arms 12 which terminate in an annular part 13, this annular part being adapted to slide upon the inner surface 14 of the said spigot housing. A helical spring 15 mounted within said spigot housing is disposed between the underside of the said annular part 13 and an internal shoulder 16 of the pipe connection member 6 so as to normally urge the axially mobile stop-valve member 11 into abutment with its seating on the underside of the flange 10. In order to ensure a fluid-tight closure of the stop-valve member 11 the latter is provided with an annular sealing member 9 at its point of contact with the flange 10. The housing of the spigot part 1 is reduced in its terminal diameter at 17 to enter the slightly flared mouth 18 of the socket terminal part 2.

Externally the spigot part 1 is provided with a peripheral flange 19 which is either undercut or has secured thereto an undercut applied facing as at 20, the undercut portion thereof serving to engage with a locking means secured externally to the socket part 2. This locking means preferably consists in a plurality of grab hooks 25, each said grab hook being pivotally mounted as at 26 upon a support bracket 27 bolted to the socket housing 2 as at 28. As shown in Figure 2, three such grab hooks are employed. The angle of the undercut face of the flange 19 and the lips 29 of the grab hooks 25 which engage thereon are preferably curved or formed tangential to an arc whose radius is struck from the grab hook pivot 26 so as to permit easy disengagement of these co-operating parts. The lips 29 of these grabs hooks are held in engagement with the undercut face of the peripheral flange 19 when the coupling parts 1 and 2 are in their coupled state by means of a pin 35 guided within a vertical slot 36 of the said support bracket 27, this pin or a roller mounted thereon as at 34 engaging with the outer edge of the grab hook 25 in the manner shown in Figure 1. The pin 35 of each support bracket 27 associated with each grab hook 25 is carried by a drag link 37 which latter is pivotally secured at its end remote from that carrying the said pin 35 to an outwardly extending arm 38 of a sleeve member 39. The sleeve member 39 is keyed as at 40 to an internally threaded sleeve nut 41 which latter is capable of axial movement relative to the pipe coupling parts by reason of its internal screw-threaded engagement with a shaft 42 which is rotatable by an attached tiller wheel 43 or like member. Thus by rotation of the tiller wheel 43 and the shaft 42 fast therewith the sleeve member 39 which is itself incapable of rotation, is moved axially of the pipe coupling, such axial movement causing the drag links 37 connected thereto to displace the pins 35 within the guide slots 36 of their respective bracket supports 27. During the first part of the movement of the pins 35 from the position shown in Figure 1 these latter remain in slidable engagement with the outer edge of their associated grab hooks 25 maintaining these latter in engagement with the undercut face of the peripheral flange 19. On approaching the extreme upper limit of the guide slots 36, however, the pins 35 are caused to abut an inclined projection 50 of the grab hooks 25 causing these latter to partially rotate upon their pivots 26 and disengage the undercut face of the peripheral flange 19. The internally threaded sleeve nut 41 in addition to carrying the said sleeve member 39 has fast with its lower end a central tubular member 51 capable of movement axially of the pipe coupling. The closed end 49 of this tubular member 51 is adapted to locate within a recess 52 formed centrally within the axially mobile stop-valve member 11 of the spigot housing so as to provide for manual control thereof by the tiller wheel 43 for opening or closing the stop-valve 11 when the spigot and socket parts of the pipe coupling are intercoupled. Thus when the pins 35 which determine the position of the grab hooks 25, are in the position shown in Figure 1 the end 49 of the said central tubular member 51 is caused to engage within the central recess 52 of the stop-valve member 11 and, to the extent desired, depress this stop-valve member so as to permit the passage of fluid between this valve member and its seating on the underside of the internally extending flange 10. Thus the extent of opening of this stop-valve for the control of the passage of fluid therethrough is accomplished by rotation of the tiller wheel 43 and the consequent axial movement of the tubular member 51 which causes the stop-valve member 11 to be displaced from its seating against the action of its return spring 15.

The tubular member 51 which controls the operation of the stop-valve member 11 when the socket and spigot parts are in their coupled condition, is supported over a portion of its length by a gland 55 provided internally with circumferential packings 56 to prevent the egress of fluid from within the housing of the socket part 2. This gland 55 is flanged externally at 57 and secured to the housing of the said socket part 2 by bolts 58, which bolts also serve to retain an external housing 59 for the shaft 42.

Slidably mounted upon the tubular member 51 is an axially mobile check-valve member 60 adapted, on uncoupling the pipe terminal parts 1 and 2 or on cessation of fluid flow from the coupling when the terminal parts are connected, to automatically seat upon the inclined upper face 61 of an annular seating member 62 and seal-off the socketed pipe terminal part 2. An annular sealing ring 66 inset into the peripheral edge of the check-valve member 60 ensures its fluid tight seating upon the inclined face 61 of the said annular seating member 52. This check-valve member which is normally urged away from its seating member 62 by the pipe fluid pressure against the action of a helical spring 63 conveniently ensures a uni-directional flow of fluid through the coupling towards the lead-off pipe 3. A supplementary helical spring 64 mounted upon the tubular member 51 and in abutment against the underside of the gland 55 is provided to contact the check-valve member 60 when the latter approaches the full extent of its opening so as to initiate its closure movement on the cessation of fluid pressure acting thereon and to prevent hammering of the said check-valve member due to pulsations in the pumping pressure of the pipe line fluid contents.

As shown in Figure 1 the said annular seating member 62 is axially mobile, being urged by a helical spring 65 into abutment with the upper machined surface of the flange 10 of the spigot part 1 when the socket and spigot parts are coupled, or with one or more stop members as at 53 when the socket and spigot parts are uncoupled.

The surfaces of the said annular seating member 62 which co-operate with the flange 10 of the spigot housing 1 and with the internal face of the socket housing 2 are provided with inset sealing rings 67 and 68 respectively to prevent fluid leakage.

Whilst it is preferable to provide an annular seating member 62 which is axially mobile within the socket housing 2, it will be readily appreciated that such a provision is not essential for if a sufficiently large and resilient sealing or packing ring disposed as at 67 be employed, the seating member may be fixed relative to the said socket housing. As shown at 70 a removable securing pin may be located between spaced lugs 71 formed externally of the shaft housing 59 to prevent unintentional rotation of the tiller wheel 43 to close the axially mobile valve member 11 of the spigot pipe terminal part 1 when the coupling is operatively connected.

In operation and assuming the spigot and socket parts 1 and 2 to be uncoupled but aligned for coupling, the spigot part 1 is inserted into the slightly flared mouth 18 of the socket part 2, the closed end 49 of the central tubular member 51 thereby entering the recess 52 of the axially mobile stop-valve member 11. In order to permit the entry of the peripheral flange 10 past the lips 29 of the grab hooks 25, these latter must be caused to occupy their outwardly extended position by ensuring that the pins 35 carried by the drag links 37 are disposed at their uppermost limit within the slots 36 so that their rollers 34 are in abutment with the projections 50 of the grab hooks, such a positioning of the said pins 35 being determined by the position of the sleeve member 39 relative to the screw-threaded shaft 42.

At this stage both the stop-valve member 11 and the automatic check-valve member 60 remain closed upon their seatings, the spring 65 which acts upon the annular seating member 62 having become slightly compressed as the latter comes into contact with the uppermost face of the spigot flange 10.

The operator now rotates the tiller wheel 43 to displace the pins 35 of the drag links 37 to contact the projections 50 of the grab hooks and thrust these into engagement with the undercut face 20 of the peripheral flange 19 so as to lock the socket and spigot pipe terminal parts in their coupled condition. Thus, the grab hooks 25 will be locked in engagement with the under-cut face of the flange 19 as soon as rotation of the tiller wheel 43 has caused the pins 35 to move downwardly in the slots 36 to a point at which the axis of the pins 35 is below the axis of the pins 26 about which the grab hooks 25 pivot. It will be seen that the movement of the pins 35 in the slots 36 to produce this position of the parts is relatively small and that the movement of the pins in the remaining part of the slots to the extreme lower end thereof provides sufficient movement for the tubular member 51 to displace the stop-valve member 11 from its seating. Not until after this locking operation has taken place does the axial movement of the central tubular member 51 cause the stop-valve member 11 to be displaced from its seating. The extent of opening of this stop-valve is now adjustable at will by rotation of the tiller wheel 43.

As has been described hereinbefore the axially mobile check-valve member 60 is automatic in operation being opened under the pressure of the pipe fluid contents to permit flow in the direction of the lead-off pipe 3.

As will be readily appreciated from the above description of the operation for coupling the pipe terminal parts, rotation of the tiller wheel or like member in a reverse direction will impart to the central tubular member 51 axial movement such as to permit closure of the stop-valve member 11 upon its seating (with consequent closure of the check-valve member 60) before the pins 35 carried by the drag links 37 abut the projections 50 of the grab hooks 25 and cause these latter to disengage from the undercut face of the peripheral flange 19 of the spigot part 1 to allow it to be uncoupled from the socket part 2.

I claim:

1. A self-sealing pipe coupling comprising two cooperating pipe terminal parts, one part being a spigot and the other part being a socket, said socket receiving said spigot therein, a locking flange formed on said spigot, a plurality of locking members pivotally carried exteriorly by said socket and disposed at spaced points around said socket each of said locking members having a cam surface along its length, said locking members pivoting to engage said locking flange to hold said spigot in position in said socket, a plurality of movable links slidably engaging said cam surfaces, a spring-loaded automatic check valve in said socket, a spring-loaded regulating valve in said spigot, an axially displaceable push rod in said socket engaging said regulating valve, a member axially movable in said socket and connected to said links and to said push rod and manually operated control means on said socket for moving said axially movable member to cause said links to pivot said locking members into locking position and to cause said push rod to open said regulating valve.

2. A self-sealing pipe coupling comprising two co-operating pipe terminal parts, one part being a spigot and the other being a socket, said socket receiving said spigot therein, a locking flange formed on said spigot and having an undercut face, a plurality of locking members pivotally carried exteriorly by said socket, and disposed at spaced points around said socket, each of said locking members having a cam surface along its length and a hook at one end, said hook engaging said undercut face to hold said spigot in position in said socket, a plurality of movable links slidably engaging said locking members, a pin carried at one end of each link, guide means on said socket for retaining each pin in contact with the cam surface of a respective locking member, a spring-loaded automatic check valve in said socket, a spring-loaded regulating valve in said spigot, an axially displaceable push rod in said socket engaging said regulating valve, a threaded member axially movable in said socket and connected to said link and said push rod, a threaded rod engaging said threaded member and manually operable means on said socket for rotating said threaded rod to thereby move said threaded member to cause said pins to slide along said cam surface so as to pivot said locking members into locking position and to cause said push rod to open said regulating valve.

References Cited in the file of this patent

UNITED STATES PATENTS

| Number | Name | Date |
| --- | --- | --- |
| 405,135 | Walton | June 11, 1889 |

(Other references on following page)

UNITED STATES PATENTS

| Number | Name | Date |
|---|---|---|
| 1,052,088 | Prettyman | Feb. 4, 1913 |
| 1,927,448 | Terry | Sept. 19, 1933 |
| 2,405,864 | Vizay | Aug. 13, 1946 |
| 2,413,571 | Krone et al. | Dec. 31, 1946 |
| 2,451,218 | Hengst | Oct. 12, 1948 |
| 2,461,818 | Hague | Feb. 15, 1949 |
| 2,462,512 | Krone et al. | Feb. 22, 1949 |
| 2,473,223 | Scheiwer | June 14, 1949 |
| 2,543,589 | Newcomb | Feb. 27, 1951 |
| 2,543,590 | Swank | Feb. 27, 1951 |